June 7, 1966    G. SONTHEIM ETAL    3,255,067
MACHINE FOR MAKING PLATES COMPOSED OF INLAID FLOORING ELEMENTS
Filed July 27, 1961    8 Sheets-Sheet 1

INVENTORS:
Georg Sontheim
Alfred Sperl
Otto Betzler
By

June 7, 1966 G. SONTHEIM ETAL 3,255,067
MACHINE FOR MAKING PLATES COMPOSED OF INLAID FLOORING ELEMENTS
Filed July 27, 1961 8 Sheets-Sheet 3

FIG. 4

INVENTORS:
Georg Sontheim
Alfred Sperl
Otto Betzler

June 7, 1966  G. SONTHEIM ETAL  3,255,067
MACHINE FOR MAKING PLATES COMPOSED OF INLAID FLOORING ELEMENTS
Filed July 27, 1961  8 Sheets-Sheet 4

INVENTORS:
Georg Sontheim
Alfred Sperl
Otto Betzler

June 7, 1966  G. SONTHEIM ETAL  3,255,067
MACHINE FOR MAKING PLATES COMPOSED OF INLAID FLOORING ELEMENTS
Filed July 27, 1961  8 Sheets-Sheet 5

INVENTORS:
Georg Sontheim
Alfred Sperl
Otto Betzler

United States Patent Office 3,255,067
Patented June 7, 1966

3,255,067
MACHINE FOR MAKING PLATES COMPOSED OF INLAID FLOORING ELEMENTS
Georg Sontheim and Alfred Sperl, Munich, and Otto Betzler, Tauberbischofsheim, Baden, Germany, assignors to Michael Weinig K.G., Tauberbischofsheim, Baden, Germany
Filed July 27, 1961, Ser. No. 127,333
Claims priority, application Germany, Aug. 1, 1960, W 28,290; Aug. 23, 1960, W 28,422; Dec. 17, 1960, W 29,104
18 Claims. (Cl. 156—522)

The present invention relates to a method of and machines for making plates composed of parquet or inlaid floor sticks or slats, said sticks or slats being held together by glueing a paper layer thereto.

The building up of such parquet or inlaid floor plates of individual sticks or slats has heretofore been effected mostly manually by placing the sticks or slats into a square frame and then glueing a paper layer thereon. The square plates were then folded once about their central axis for facilitating the transport of the plates.

According to another heretofore known method of building up such plates, two rows of differently arranged groups of plates were pushed together to form a double row of a corresponding pattern, and the double row was then combined to form a square which again was covered by a paper layer glued thereon and folded for purposes of transport along the center line thereof.

These heretofore known methods are rather time-consuming. Moreover, the last mentioned method requires considerable space for the feeding means.

According to another heretofore known automatic method, groups offset with regard to each other by 90° and composed each of five sticks or slats of the same fiber direction were built up by providing two conveyor belts arranged at a right angle with regard to each other, on which the sticks or slats were deposited in a direction transverse to the feeding direction. At the crossing point there is provided a gate which makes it possible that the two belts alternately drop a group of five sticks or slats on a conveyor belt which moves in the feeding direction of one of the two belts at the end of this common belt, each time a number of groups is deposited on a third conveyor belt in a direction transverse to the feeding direction thereof. A machine for carrying out this method is rather complicated because a plurality of conveyor belts are required, and furthermore, a precise rhythmic cooperation of the gate means is required in order to assure a proper working of the machine.

According to another heretofore known automatic setting machine, groups of sticks or slats are taken off from a conveyor belt at certain intervals in a direction transverse to the feeding direction and are along a circular path conveyed to a second conveyor belt at the end of which the first conveyor belt is arranged perpendicularly thereto. Also, this machine requires high precision and in addition thereto has the drawback that the sticks or slats passed along a circular arc can easily tilt.

It is, therefore, an object of the present invention to provide a method of and a machine for making plates composed of parquet or inlaid floor sticks or slats, which will overcome the above-mentioned drawbacks.

It is another object of this invention to provide a method of and machine for automatically and continuously composing individual sticks or slats or groups thereof to plates in a materially simplified and highly economic manner.

These and other objects and advantages of the invention will appear more clearly from the following specification in connection with the accompanying drawings, in which.

According to one method of the present invention for building up plates from parquet or inlaid floor sticks or slats, such sticks or slats are composed to groups of different fiber direction and are subsequently held together by glueing thereto a paper layer, while in conformity with the present invention the sticks or slats are in form of layers combined to the desired groups of different fiber direction and are stored in magazines which are arranged at the end side of the machine or are grouped therearound. Each time one layer of sticks or slats is placed by a slide onto a table. After a plurality of groups have been combined, they are, while lying on the table, covered by a paper layer which is glued thereto. The further transport of the sticks or the slats placed on a guiding path is preferably effected by the placing of new slats or sticks during the next working cycle of the machine. However, also a separate feeding device may be provided for the sticks or slats placed on the guiding path. In order in this connection to increase the output of the machine, the feeding device is advantageously, after completion of its forward movement, adapted to be lifted off during its return movement so that already during the return movement of the feeding device, the sticks or slats may be withdrawn from the magazine towers and placed upon the guiding path.

If the machine is intended for making chessboard-like plates composed of squares, while the squares consist of a plurality of sticks or slats and the sticks or slats of adjacent squares are arranged in directions perpendicular to each other, there are, according to one embodiment of the invention provided four magazine towers of which two magazine towers are arranged at different sides of the guiding path and are offset to each other by a square. The other two magazine towers are at the end of the guiding path likewise offset with regard to each other by a square. Such an arrangement makes it possible that in spite of the fact that the squares composed of individual sticks or slats are offset in a chessboard-like manner, the sticks or slats of each square will be moved out of the magazine towers in their longitudinal direction, whereas if the arrangement were different, a portion of the sticks or slats composed of a square would have to be moved transversely to their longitudinal direction. If desired, the sticks or slats may also be combined to the desired groups of different fiber direction and stored in magazines which are combined to a unit at the end face of the machine, by means of a slide, each time a layer of sticks or slats of all filled magazines is simultaneously pushed onto a table. This method likewise forms a part of the present invention.

According to one embodiment of the present invention, two magazines each are arranged in series in the feeding direction of the slide, and the sticks or slats are stored in one magazine in longitudinal direction, and in the other magazine in transverse direction.

This slide is adapted each time simultaneously to move two serially arranged rows of groups of parquet sticks or slats, one row corresponding to the width of the plate to be produced.

This method and machine for carrying out said method have the particular advantage that the group of parquet sticks or slats do not have alternately in a certain rhythm to be placed upon the common table, or that it is necessary to turn a plurality of groups into their horizontal position in front of the table. The parquet sticks or slats are rather stored in magazines already in their proper position, and it is merely necessary to provide a slide which simultaneously transports at least two rows of groups onto the common table.

The inlaid floor setting machine according to the invention may be equipped with a paper applying apparatus which comprises a paper storage roll, a cutting device, an adhesive applying device, and a pressing roller. Such paper applying device is controlled in such a way that the plate during the composing thereof and while leaving free a certain strip at the start and end of the plate, will get a paper layer glued thereto.

According to one embodiment of the invention, the applying of the paper is effected by cutting the endless paper web glued to a plate, when looking in feeding direction of the plates, approximately 5 millimeters ahead of the abutment gap with the next succeeding plate. Thereupon, the endless portion of the paper web connected to the roller is pulled back by a distance of approximately 10 millimeters, and subsequently is applied to the next following plate. In conformity with the present invention, the cutting-off of the adhesive covered paper web and the subsequent pulling back of the web in conformity with the rhythmic advance of the individual parquet or inlaid floor plates, is effected. It is advantageous subsequently to press the cut-off and glued-on paper web against the upper or lower surface of the plate.

A machine for carrying out the method according to the present invention may be designed in various manner. One embodiment of such machine according to the invention is characterized in that on both sides of the paper web there is provided a roller, and the paper web is passed over an adhesive or water applying roller and a subsequent pressing roller having associated therewith a cutting device movable transverse to the feeding direction of the plates. Advantageously, the first mentioned roller has associated therewith a lifting off device which is controlled by the cutting device so that simultaneously with the lifting off of the roller, the pull-back of the paper web becomes effective. The operation may be carried out mechanically, pneumatically, hydraulically or electrically. When employing a mechanical control system, the rollers between which the paper web passes are journalled in a pendulum-like manner on levers which are under the influence of springs or other power means. The arrangement is such that the lever of one roller is connected through the intervention of a bar to the lever of the pressing roller for the adhesive paper in such a way that when lifting off the pressing roller for the adhesive paper, the paper web will automatically be turned back or pulled back.

The working speed of the machine according to the present invention depends to a considerable extent on the speed at which the magazine towers can be filled. In order to facilitate and accelerate this filling, according to the present invention, boxes are provided which are filled by a special filling machine with assorted sticks or slats and which are provided with an opening at the bottom, which opening is adapted to be closed by a slide or gate. The filled boxes are placed upon the magazine towers, and the gate or slide is pulled out so that the sticks or slats will freely drop into the towers. Thereupon, the empty box is pulled upwardly. This filling may be effected during the operation of the setting machine so that no work stoppage will be necessary. The storing of the sticks or slats may be effected automatically, and if desired, simultaneously a sorting according to different colors or similar aspects may be effected.

To this end, the sticks or slats are conveyed one after another through a passage onto a table and are deposited thereon alongside each other. When a stick or slat hits an abutment on said table, automatically a slide or gate becomes effective which will convey a predetermined number of said sticks or slats into a magazine adjacent said table.

In order to make possible a full automatic storage or piling up in a particularly simple manner, the bottom of the magazine is subsequently lowered to such an extent that the piled up sticks or slats will be located below the table surface. The transporting and feeding operations are repeated until the magazine is filled layer by layer with sticks or slats.

If the sticks or slats have to be sorted simultaneously, according to a further development of the invention, sticks or slats of different appearance are separately introduced into different passages and are stored in the above-mentioned manner in different magazines.

The machine for carrying out the storing method consists of a guiding passage and a subsequent table at one edge on which there is provided a slide, while adjacent the other edge there is provided a magazine. The table is provided with an abutment which in response to contacting one of the sticks or slats, initiates the movement of the slide in the direction toward the magazine. Preferably, the slide is arranged in feeding direction and is movable transverse to the feeding direction. The abutment initiating the movement of the slide is preferably arranged in feeding direction of the table end so that the respective foremost stick or slat of a row of sticks or slats later forming a layer in the magazine will hit the abutment and initiate the movement of the slide.

According to a particularly favorable design of the machine according to the present invention, the magazine is provided with a bottom adjustable as to height and adapted, after a row of sticks or slats has been introduced into the magazine, to be lowered to such an extent that the surface of the filled-in sticks or slats will be located below the table surface. In this way, a uniform depositing of the sticks or slats in one layer over the other, will be possible. The lowering of the bottom is preferably effected by means of a control switch on the magazine, which switch will contact the respective sticks or slats to be moved into the magazine.

The movement of the slide may be controlled by air under pressure, hydraulically, or mechanically.

The guiding passage is preferably preceded by a conveyor belt on which the sticks or slats are deposited.

If desired, a plurality of guiding passages and subsequent tables and magazines may be combined in a single machine so that a simultaneous storing or piling up in a plurality of magazines will be possible. Sticks or slats of different type or different appearance may be deposited on the conveyor belts preceding the guiding passages so that the sticks or slats may simultaneously be sorted in a simple manner.

Figure 1:
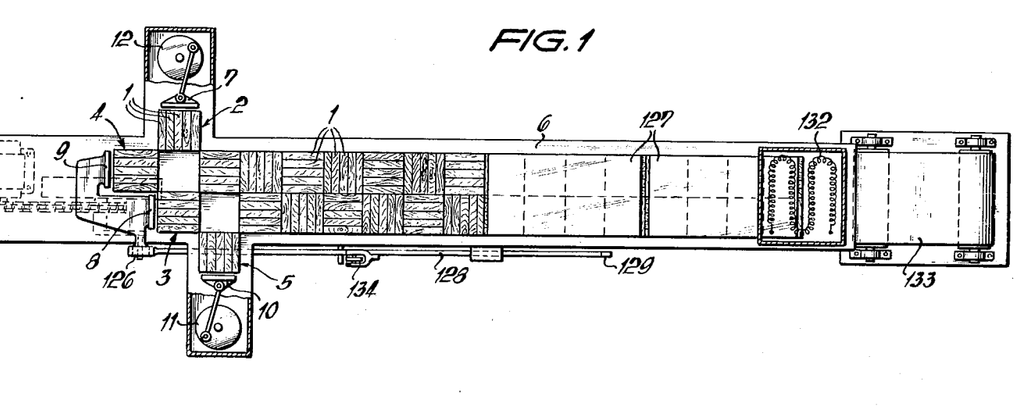
FIGURE 1 diagrammatically illustrates a top view of an inlaid floor setting machine according to the invention.
Figure 2:
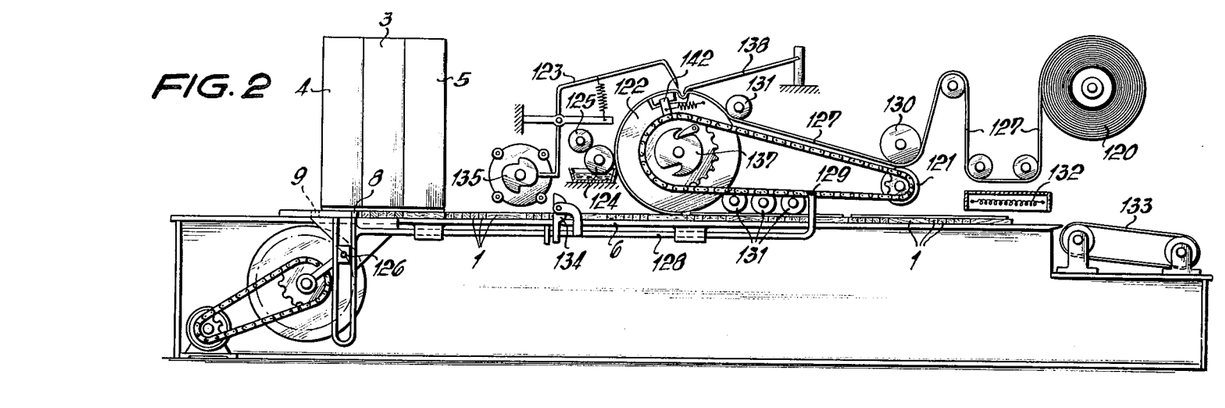
FIGURE 2 is a diagrammatic illustration of a side view of the machine shown in FIGURE 1.

Referring now to the drawings in detail, the parquet or inlaid floor setting machine illustrated in FIGS. 1 and 2 is intended for making up a rectangular plate of squares which, in their turn, are formed by a plurality of wooden sticks or slats. The said sticks or slats 1 of each square are arranged in vertically standing towers 2, 3, 4 and 5 which are grouped around the end of a guiding path 6 upon which the said sticks or slats are in squares placed by means of slides 7, 8, 9 and 10 (illustrated diagrammatically). The arrangement is such that each time the respective lowermost layer of the sticks or slots piled up in the towers 2, 3, 4 and 5 is placed upon the guiding path 6.

In order to obtain the chessboard-like pattern shown in FIG. 1 according to which the sticks or slats of adjacent squares are arranged in directions perpendicular to each other, the towers 2, 5 arranged laterally of the guiding path 6, and also the towers 3, 4 arranged at the end face of the guiding path 6 are respectively offset by a square with regard to each other. In this way, it will be possible always to displace the sticks or slots in their longitudinal direction.

According to the arrangement shown in FIGS. 1 and 2, first the two slides 7 and 10 will be actuated, which respectively move one layer of sticks or slats out of the towers 2 and 5 onto the guiding path 6. Thereupon, the slides 8 and 9 are actuated which respectively move one layer of sticks or slats out of towers 3 and 4 and onto the guiding path 6, while all of the sticks or slats on guiding path 6 are advanced by two squares. This advance or feed by the slides 8 and 9 is effected during the return movement of slides 7 and 10. Already, when the slides 8 and 9 have moved backwards by the length of one square, the slides 7 and 8 may again be actuated and may move the next layer of sticks or slats out of the towers 2 and 5 and onto the path 6. The movement of slides 7, 8, 9 and 10 is effected by motor-driven crank or eccentric drives 11, 12 and 126 or by a corresponding link layer system.

The squares on guiding path 6 will then pass below a paper applying device 14 which according to FIG. 1 consists of a paper roll 15, a transporting roll 16, a paper cutter 17, and an adhesive applying roll 18 with stripper roll 19. The arrangement furthermore comprises an adhesive container 20. The paper applying device is controlled by a crank drive in such a way that the plate made up to the desired size is covered by an adhesive containing paper web while leaving free a certain strip at the start and the end of the plate. The paper covered plate which is held together by said paper is then placed on a conveyor belt 21 and fed by the latter, for instance, to a packing machine. Between the paper applying device 14 and the conveyor belt 21 there is interposed a drying device for accelerating the drying of the adhesive.

The squares on guiding path 6 will eventually move below a paper applying device which according to FIG. 2 comprises a paper roll 120, a transporting roller 121, a paper applying roller 122, a paper cutter 123, and an adhesive applying roller 124 with stripper roller 125. The paper applying device is controlled by a crank drive 126 in such a way that the composite plate of desired size will have glued thereon a paper web while a certain strip is left free at the start and the end of said plate. The application of the paper web 127 provided with an adhesive to the squares on guiding path 6 is effected in conformity with FIG. 2 in the following manner:

Connected to the crank drive 126 is a control rail 128 which is in its turn is fixedly connected to a chain drive 129. During the forward movement of the crank drive 126, automatically the chain drive 129 is moved which latter drives the transporting roller 121 and paper applying roller 122 through the intervention of a ratchet mechanism 137. The paper web 127 is moved between the transporting roller 121, the pressure rollers 130 and 131 below the paper applying roller 122, passes by the adhesive applying roller 124 and is applied to the squares on guiding path 6 (FIG. 1) whereupon it is pressed against said squares by the pressure rollers 131. The plate which thus has the paper glued thereto and in this way is held together then passes below a drying device 132 to a conveyor belt 133 and from the latter for instance to a packing machine.

The leaving free of a strip at the start and the end of the plate is effected in conformity with FIG. 2 in the following manner:

The transport roller 121 withdraws from paper roller 122 during the advance of the control slide 128 precisely as much paper as is required for a crank rhythm. At the same time, this paper web is applied to the paper applying roller 122 the diameter of which is so selected that its circumference equals the length of the plate minus the two strips to be left free at the start and the end of the plate. During the return stroke of the control slide 128, lever 134 which is rotatably journalled on control slide 128 actuates a cam 135 which in its turn again actuates the cutting knife 123. The cutting knife will following the cutting through of the paper web immediately be returned to its starting position by the correspondingly designed cam 135.

Figure 4:
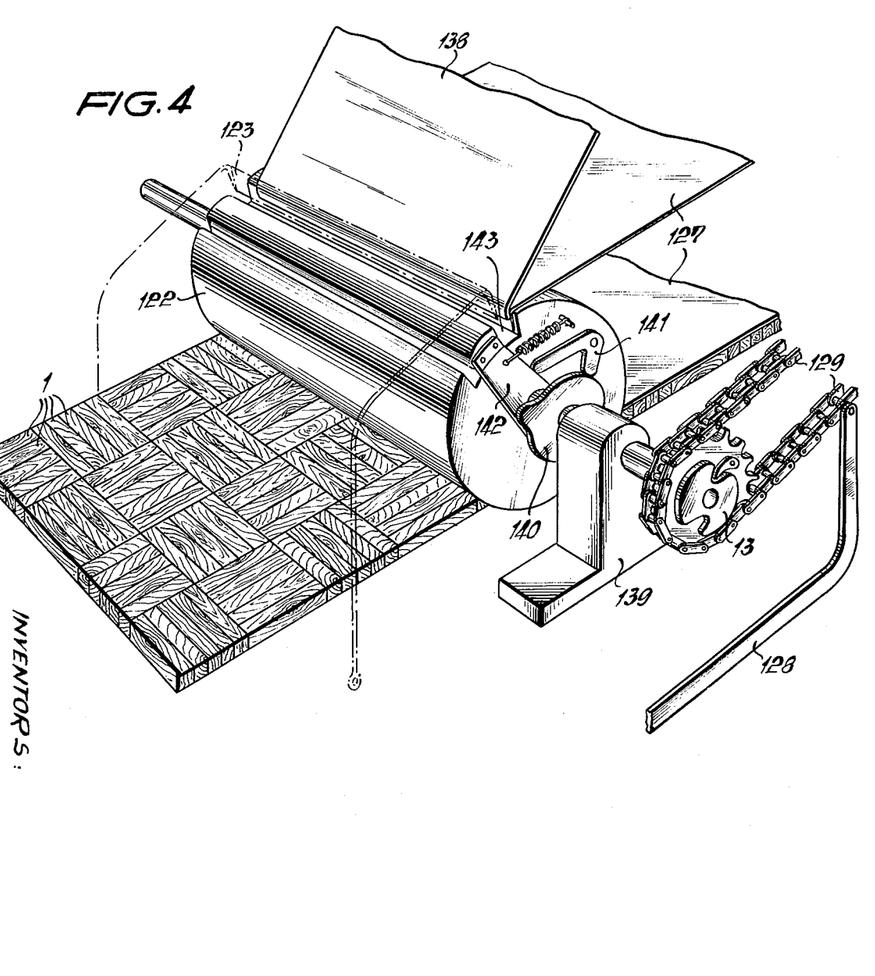
FIGURE 4 is a perspective view of a paper applying and cutting device.

As will be evident from FIG. 4, the cut-off paper web is held on the feeding side by a resilient metal sheet 138 until due to the further movement of the paper applying roller 122 the cam 140 fixedly connected to the support 139 releases the clamping segment 142 through the control lever 141. This clamping segment 142 presses the cut-off paper web 127 against surface 143 in the recess of the paper applying roller 122 and retains the cut-off paper web. When the squares being advanced on the guiding path 6 (FIG. 1) have been reached, the cam 140 (FIG. 4) releases the clamping segment and releases the paper intended to be glued to the plates.

Figure 3:
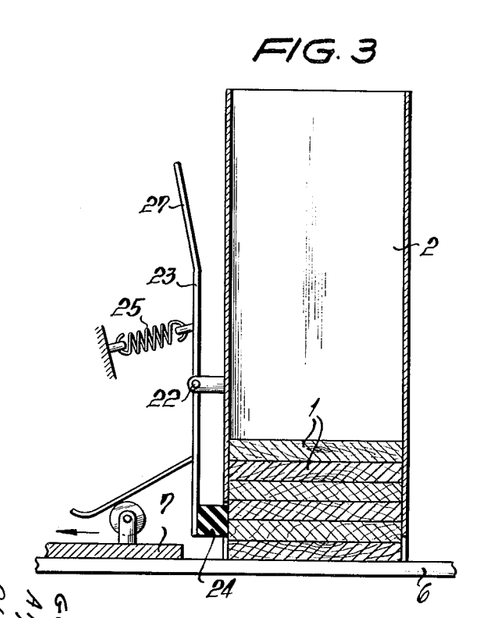
FIGURE 3 diagrammatically illustrates a side view of a magazine tower employed in connection with the setting machine according to the invention.

FIG. 3 illustrates the construction of a magazine tower 2 in side view. Each tower consists of three side walls and is open at one side in front of which there is provided a clamping plate 23 rotatable about a pivot 22. Clamping plate 23 carries a rubber block 24 at its lower end. When the tower is filled with pre-sorted wooden sticks or slats, the rubber block 24 is by means of a spring 25 pressed against the last-but-one layer of sticks or slats. The purpose of this consists in avoiding that the face of the sticks or slats in the tower will rest on the lowermost layer of sticks or slats which are to be moved by slide 7 onto the guiding path 6. Above all, it is to be avoided that the last-but-one layer, following the moving out of the lowermost layer will tilt downwardly at one side when the slide moves back. It will be appreciated that by such tilting movement the lowermost layer would be disturbed and the outward movement of the latter during the next working cycle of the slide might be impeded. Slide 7 will, during its return stroke, following the movement out of the tower, tilt the clamping plate 23 to such an extent that the rubber block 24 will be lifted off from the pile of sticks or slats so that the latter can follow downwardly. At the latest, when slide 7 starts its feeding stroke, the clamping plate 23 will be free, and the rubber block 24 will again by spring 25 be pressed against the last-but-one layer from the bottom.

The upper portion 27 of clamping plate 23 is slightly bent outwardly in order to assure an automatic insertion of the sticks or slats when filling the magazine towers.

Figure 5:
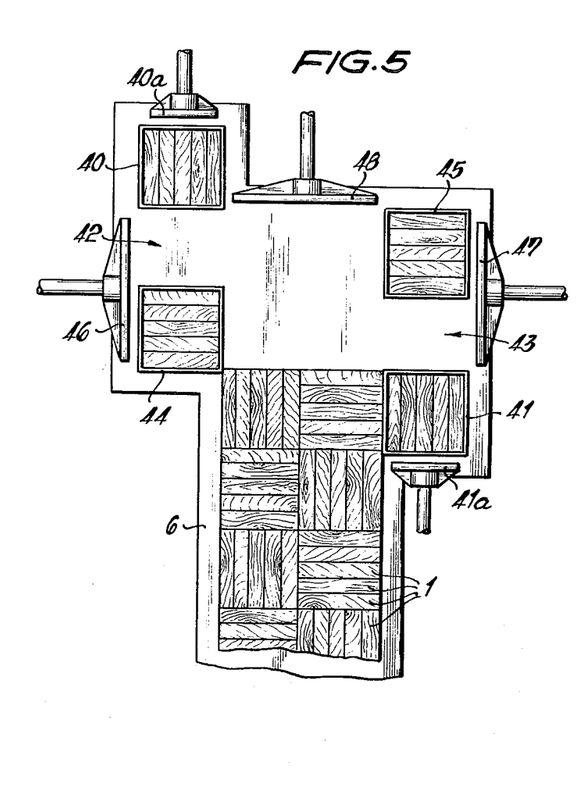
FIGURE 5 is a diagrammatic top view with a modified arrangement of the magazine towers.
Figure 6:
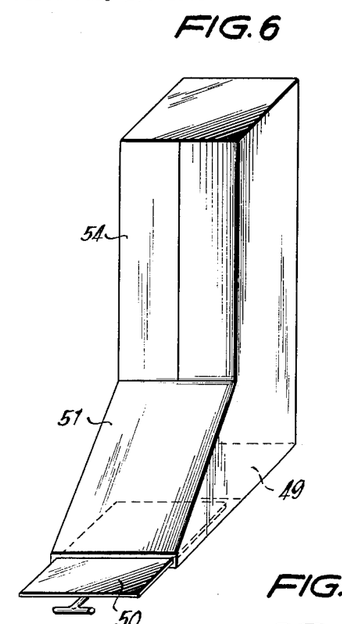
FIGURE 6 shows a filling box for filling the magazine towers.

Whereas in FIGS. 1 and 2, the magazine towers are arranged laterally of and also at the end face of the guiding path 6, FIG. 5 illustrates an arrangement according to which all magazine towers are arranged laterally of the guiding path. In order also that this arrangement could effect the discharge from the magazine towers always in longitudinal direction of the individual wooden sticks or slats, the said sticks or slats must first be removed from towers 40 and 41 by slides 40a and 41a onto the free spaces 42 and 43 from where they can then, together with the sticks or slats from towers 44 and 45, be moved onto the guiding path 6 by slides 46 and 47. The feed is effected by a separate slide 48. The invention is also concerned with a device for quickly filling the magazine towers. To this end, according to one embodiment of the invention, the boxes illustrated in FIG. 6 are provided which are adapted to be placed upon the magazine towers, and the bottom opening 49 of which may selectively be closed and opened by means of a slide 50 adapted to be pulled out. The enlargement 51 at the lower end of the box is intended primarily for journalling and guiding slide 50.

Figure 7:
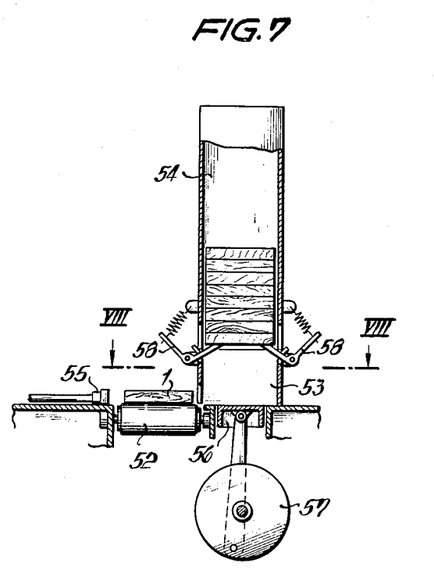
FIGURE 7 is an elevation of an apparatus for filling the filling box.
Figure 8:
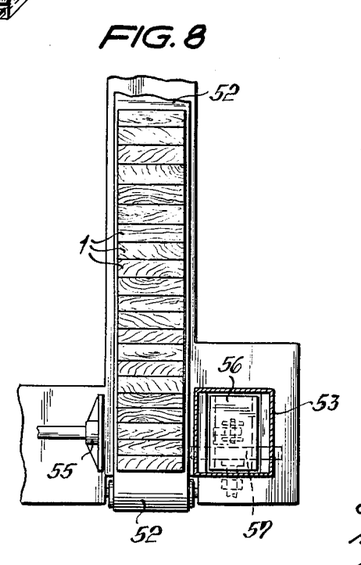
FIGURE 8 is a diagrammatic top view of the apparatus shown in FIGURE 7.

For purposes of filling the box, there is provided an arrangement illustrated in FIGS. 7 and 8. As will be seen from these figures, the sorted sticks or slats pass on a guiding path 52, for instance, a conveyor belt, from the machine tools to a frame 53 having mounted thereon a box 54 according to FIG. 7. By means of a slide 55, each time five sticks or slats are moved into frame 53. This group of sticks or slats is by means of a vertical slide 56 operable by a crank drive 57 moved in upward direction. During this upward movement of slide 56, the guiding plates 58 are tilted upwardly and sidewardly by the lifted sticks or slats. These plates are adapted below the lifted sticks or slats again to return to their FIG. 7 position, thereby holding the sticks or slats while slide 56 returns to its lower position. The same cycle is repeated again and again until the box 54 is filled. Thereupon slide 50 is actuated, and the bottom opening 49 of the box is closed. The filled boxes are in groups moved to the setting machine, and the magazine towers are filled by placing the boxes on said magazine towers and pulling out the slide 50. The clamping plates 23 (FIG. 3) and the guiding members 27 and 28 thereof will see to it that the sticks or slats will be properly placed in the towers while they slide downwardly therein. This filling is effected during the operation so that the machine will be able to operate without interruption.

Figure 9:
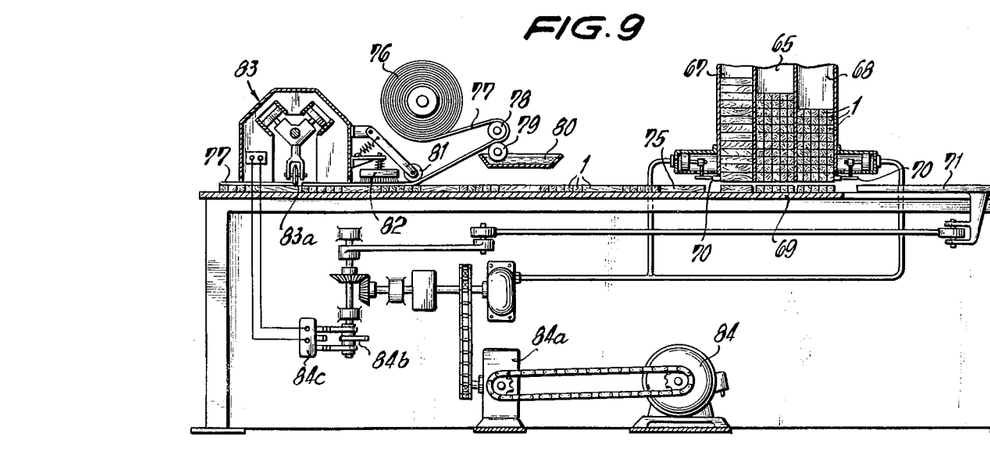
FIGURE 9 diagrammatically illustrates, in side view, a modified setting machine according to the present invention.
Figure 10:
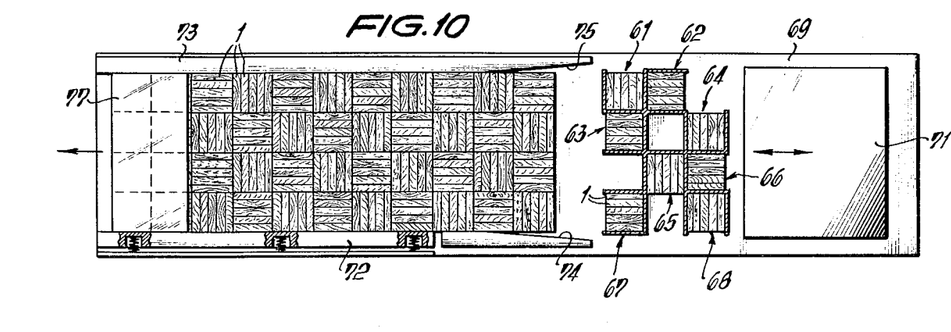
FIGURE 10 is a top view of the machine of FIGURE 9.

FIG. 9 illustrates a modification of the machine according to the present invention. At the end face of the machine there is arranged a plurality of exchangeable magazines 61 to 68 combined to a unit. In said magazines there are stored or piled up inlaid flooring sticks or slats in such a way that each two magazines 61, 62; 63, 64; 65, 66; and 67, 68 arranged one behind the other when looking in the feeding direction of the table 69, contain groups of different fiber direction of inlaid flooring sticks or slats. The said magazines are charged from their respective open sides. Each magazine is provided with a pneumatically operable clamping plate 70 which presses the last-but-one layer of said sticks or slats in horizontal direction against the magazine wall. The clamping plate may be so arranged that it acts upon the end faces of the sticks or slats of a layer. Advantageously, however, the pressure is exerted upon the side surface of the outermost stick or slat because in such an instance, the layer can be safely held, even if one of the sticks or slats is shorter than the others. The lowermost layer of the sticks or slats in the magazine will drop upon the table below the magazines, whereas the superimposed layer will be held by the clamping plates. A slide 71 the surface of which corresponds substantially to the ground plan of the magazine unit is moved against the layer of sticks or slats on the table and transports said layer further. The table is provided with laterally arranged guiding rails 72, 73. Guiding rail 72 is resiliently pressed against the assembled sticks or slats. The two rails have conically extending inner edges 74, 75 which make possible a more accurate introduction of the composed sticks or slats. Instead of conical edges, it is also possible to use a laterally arranged slide for moving the sticks or slats together.

Above the machine there is arranged a paper roll 76 from which a paper web 77 is withdrawn and passed around the guiding roller 78. The applying roller 79 is, during its rotation, humidified in the adhesive storage container 80 and releases the received adhesive, preferably in form of a strip, to the paper web 77. Pressure roller 81 presses the paper against the surface of the composed or assembled sticks or slats. A brush 82 arranged behind roller 81 will assure a uniform engagement of the paper web with the respective sticks or slats. At the machine end there is arranged a cutting device 83 which is equipped with knives movable transverse to the feed direction of the band. The knives cut through the paper web so that at the end of the machine, the finished plates can be withdrawn and packed. A scratching of the surface of said sticks or slats during the cutting operation is immaterial because these surfaces will be ground off after the flooring has been laid.

The movements of the slide 71 (FIG. 9) of the clamping plates 70, of the cutting device 83 with the knives 83a are coordinated to each other and are controlled by a common motor 84 through the gears 84a and cams 84b operating the limit switches 84c.

Figures 11, 11A:
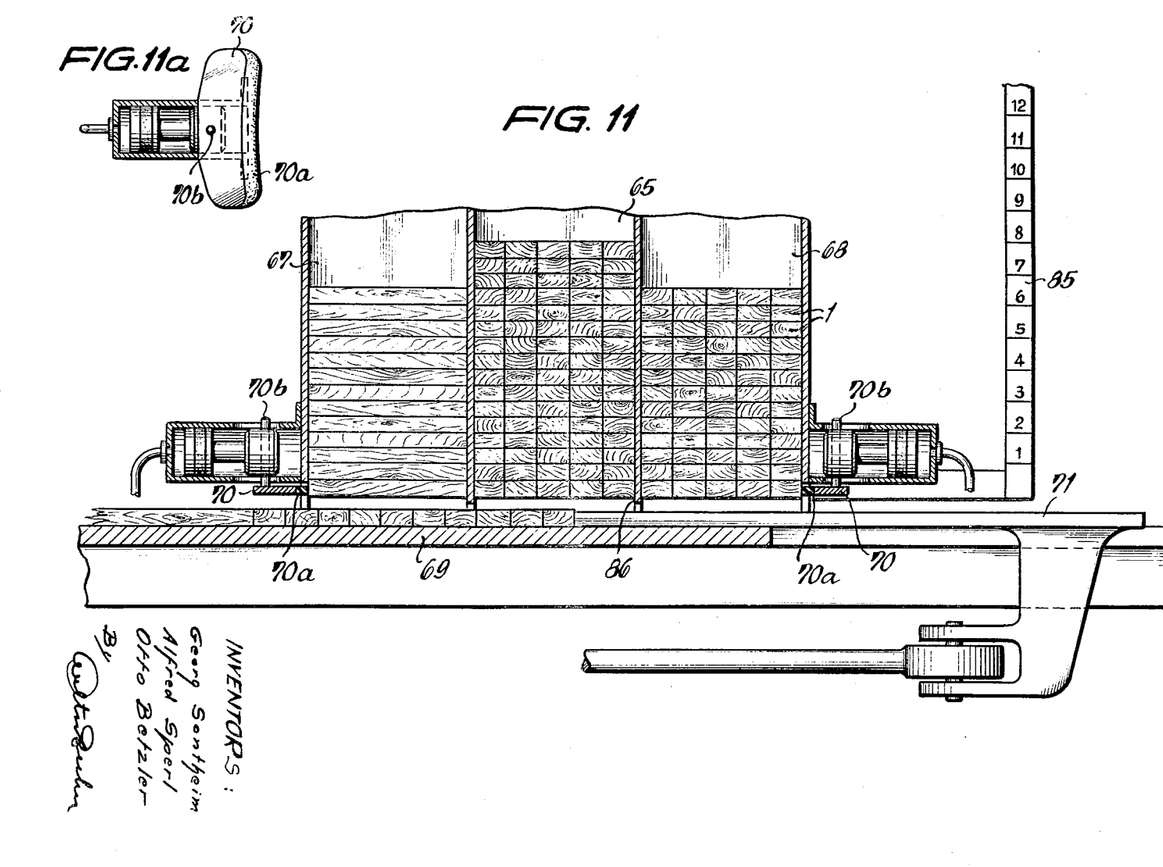
FIGURE 11 is a side view of the magazines arranged at the end face of FIGURE 9.

FIG. 11 represents a side view of the magazines in detail. As will be seen from FIG. 11, the longitudinal edges of the magazine are advantageously provided with markings 85 so that different types of sticks or slats, for instance, of different colors or of a different type of wood, may be piled one above the other while, in conformity with a certain set of markings, always plates of the same pattern will be produced. It is also possible by filling in different wood types, to obtain different patterns of the plates to be produced in a precisely predetermined manner. The change from one pattern to another pattern or from one plate type to another plate type, will be effected automatically without the necessity of interrupting the manufacturing process.

The thickness of the slide should be somewhat less than the thickness of the inlaid flooring sticks or slats. The distance between the slide surface and the next layer should not be in excess of the thickness of said sticks or slats in order to prevent the sticks which follow from tilting during the return movement of the slide or during the opening of the clamping plates.

The clamping plates 70 (FIG. 11a) have their end face edges slightly curved and provided with an elastic bead 70a. The clamping plates are movable about a vertical axis 70b within certain limits in such a way that always a safe engagement of the clamping plates with the sticks or slats, will be assured.

With the magazines 62 and 66, a clamping of the second lowermost layer is not necessary because the following sticks, when dropping, will rest on the surface of the slide and will be prevented from advancing by the magazine sidewalls, for instance wall 86 (in FIG. 11) extending up to said surface. In the magazines facing the guiding rails, however, a clamping of the second lowermost layer is necessary in order that the slats which have dropped onto the table from the magazines therebehind will not be prevented from advancing.

The magazines of the magazine unit are exchangeable. It is also possible to exchange the entire unit for another one which contains magazines of a different size. In these magazines, inlaid flooring sticks or slats of a different length may be arranged. The magazines may be filled manually or automatically by means of conveyor belts.

The actuation of the clamping plates may, of course, also be effected hydraulically or electromagnetically.

Figure 12:
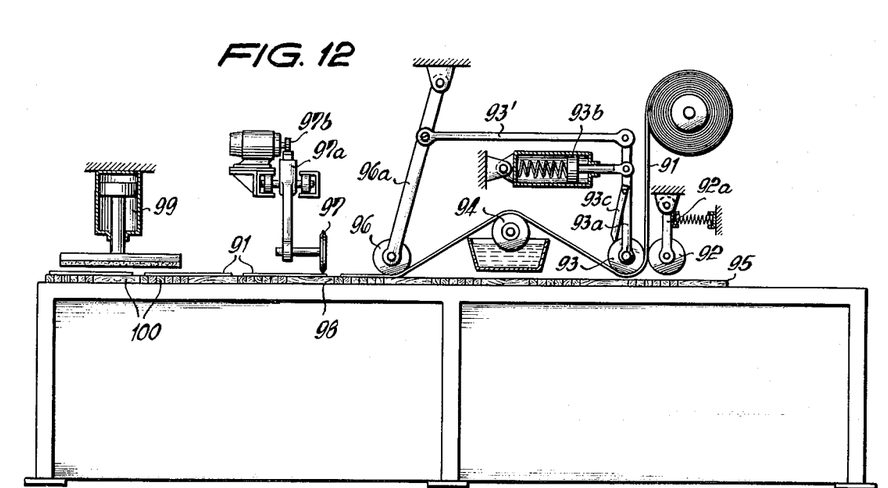
FIGURE 12 is a diagrammatic longitudinal section through a modified paper cutting device.
Figure 13:
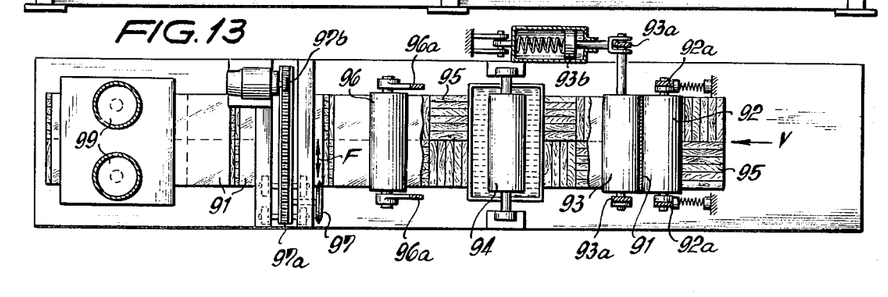
FIGURE 13 is a top view of the device according to FIGURE 12.

FIGS. 12 and 13 illustrate a modified paper-cutting device. The endless paper band 91 is between two rollers 92 and 93 passed over a humidifying or adhesive-applying roller 94 and then below a pressure roller 96 onto the endlessly mechanically composed mosaic inlaid flooring band 95. The cutting knife 97 (FIG. 12) is by means of a cutting device 97a and an electric motor, a gear rack or roller chain 97, and by cam 84b (FIG. 9) and limit switch 84c controlled precisely in the rhythm of the mechanical composition of the inlaid flooring sticks or slats guided to an endless band above the paper from one side to the other side (see arrow F in FIG. 13) and cuts the paper. When looking in feeding direction, the cut is effected approximately 5 millimeters ahead of the abutting joint 98 of two plates. After the cutting operation has been completed, a mechanical, pneumatic, hydraulic or electrical control turns the roller 93 (FIG. 12) back by approximately 10 millimeters, or the paper web is pulled back in any other convenient manner. This is effected preferably in the following manner evident from FIG. 12. By subjecting the pneumatic piston 93b to pressure fluid, piston 93b will pull forward levers 93', 93a and 96a to which roller 96 is connected. As a result thereof, roller 96 is lifted off the paper web and, simultaneously, roller 93 is by lever 93c turned back by approximately 10 millimeters. The switching on of these functions is effected again by cam 84b and limit switch 84c (FIG. 9) precisely in conformity with the working rhythm of the machine. Simultaneously, the pressure roller 96 is lifted off from the paper band by a few millimeters. Due to the turning backwards of the roller 93, the cut-off paper band 91 is pulled back by approximately 10 millimeters because the paper band 91 is glued on only by a short distance, and because the glue is still very moist. After the pull-back operation has been completed, the roller 96 is again pressed against the inlet flooring sticks or slats in order to make sure that during the forward movement of the band of sticks or slats 95, the paper band 91 will automatically again be glued on and withdrawn. At the end of the automatic cutting and glueing device, the glued-on paper will once more be pressed against the sticks or slats by a pressing device 99 which may be operated mechanically, pneumatically, or hydraulically, so as to make sure that an intimate bonding between paper and sticks or slats, will be effected.

In view of the described cutting and glueing operation, there are now obtained separately paper-covered plates 100 (FIG. 12) which are no longer connected to each other and which after leaving the machine can be individually stacked and packed. With the arrangement according to the invention, the endless paper band 91 is cut through by one knife 97 only and approximately 5 millimeters ahead of the abutting joint 98 of two plates 100. By the mechanical device, the paper band is subsequently again pulled back by approximately 10 millimeters. In this way, on both sides of adjacent plates 100 there will be obtained an approximately 5 millimeters wide paper-free edge. This operation is continuously and fully automatically repeated.

In the illustrated embodiment, the rollers 92, 93 which are arranged at both sides of the glueing path 91 are journalled on levers 92a, 93a in a pendulum-like manner, said levers being subjected to the thrust of springs or the like. Lever 93a of roller 93 is by means of a bar 93' operatively connected to a lever 96a the lower end of which carries the pressing roller 96. The arrangement is such that when the roller 96 is lifted off, the device effecting the rearward movement bringing about the pulling-back of web 91 will become effective.

Figures 14, 15, 16:
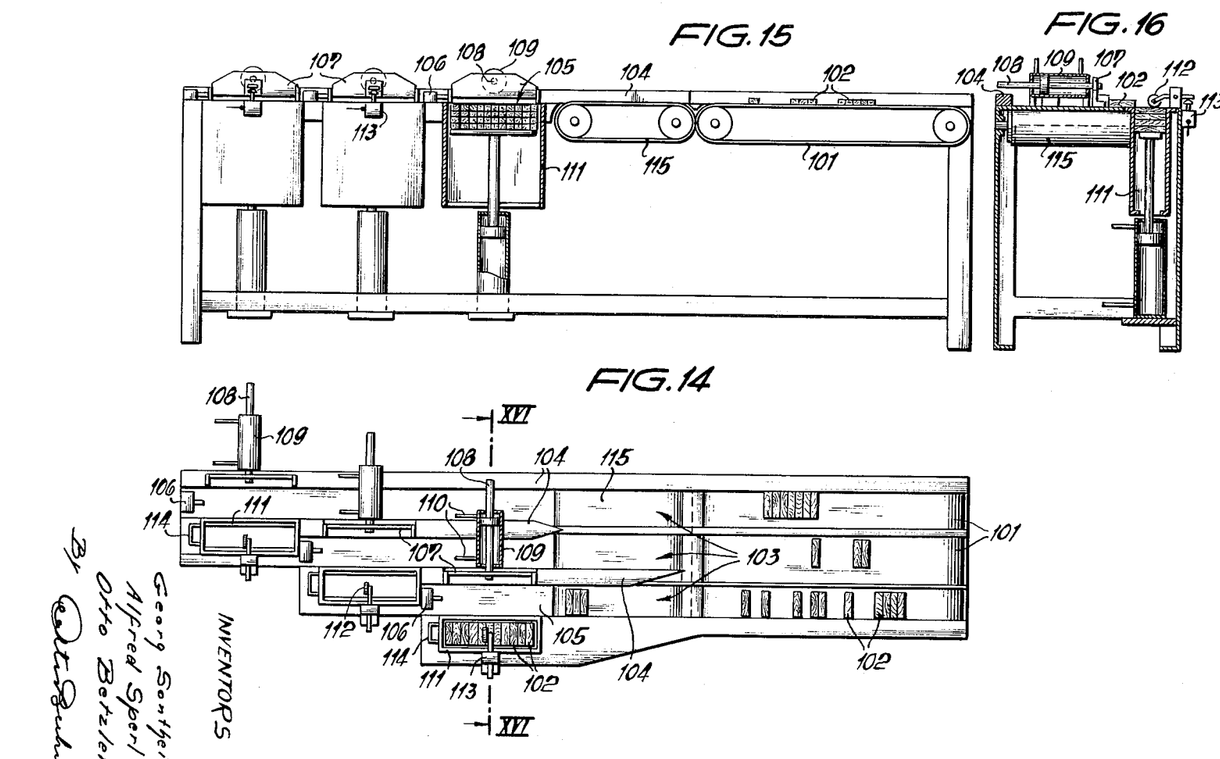
FIGURE 14 is a top view of the automatic piling-up machine.
FIGURE 15 is a side view of the machine according to FIGURE 14.
FIGURE 16 is a section along the line XVI—XVI of FIGURE 14.

FIGS. 14 to 16 illustrate the stacking or storing machine according to the invention. This machine comprises a conveyor belt 101 on which the sticks or slats 102 are deposited. This depositing may be effected manually while simultaneously the sticks or slats may be sorted. However, it is also possible directly to connect the conveyor belt with the machine which produces said sticks or slats. From the conveyor belt, the sticks or slats pass into passages 103 provided with guiding rails 104. Below said passages there are arranged conveying means, for instance belts 115 or rotating discs.

The guiding rails will give the sticks or slats a precise parallel position. At the exit of the passages, the sticks or slats will in this position be moved onto the table 105 and, due to the next following sticks or slats transported by the conveyor belt, will be placed closely adjacent to each other. This row of sticks or slats now advances until the foremost stick or slat engages the abutment 106.

At the longitudinal edge of the table, in feeding direction, there is arranged a rail 107 which is firmly connected to bar 108 movable transverse to the feeding direction. The slide comprising rail 107 and bar 108 is actuated by a piston reciprocably mounted in cylinder 109. The movement of the piston may be effected by compressed air, hydraulically, or mechanically. In the particular example shown, a compressed air conduit 110 is provided for this purpose.

Adjacent the table there is arranged an exchangeable magazine 111. The slide is adapted to convey into this magazine a number of sticks or slats, depending on the length of the rail 107. The bottom of the magazine is below the surface of the table and is spaced therefrom by a distance corresponding approximately to the thickness of the sticks or slats. During the introduction of the sticks or slats into this magazine, a roller or nose 112 is engaged which, in turn, actuates a switch 113. The closing of this switch brings about a lowering of the magazine bottom by approximately the thickness of the sticks or slats. In this way, all three magazines will be filled with sticks layer by layer. They may then by grasping handle 114, be pulled out and replaced by empty magazines.

It is, of course, to be understood, that the present invention is, by no means, limited to the particular embodiments shown in the drawings but also comprises any modifications within the scope of the appended claims.

What we claim is:

1. In a machine for composing single layers of inlaid flooring elements in multiple rows to plates of a desired pattern: a horizontal pathway for receiving inlaid flooring elements and guiding the same in form of plates composed of said elements, a plurality of vertical magazine towers for each of said multiple rows arranged adjacent said pathway at one end and adapted respectively to receive and hold stacks of different groups of inlaid flooring bar elements in superimposed layers, feed means arranged adjacent said magazine towers at the bottom thereof and operable respectively to move one layer only at a time from each of said magazine towers and to move the same onto said pathway in adjacent arrangement to layers from others of the towers and advance the several layers thus fed thereon in one direction along said horizontal pathway, a roll of paper above the pathway, a pair of rollers arranged above said pathway for receiving therebetween a paper web withdrawn from said roll, means following said pair of rollers in the direction of advancement of said plates on said pathway for applying adhesive to the paper web passed through said pair of rollers, pressing means following said last mentioned means in said direction of advancement for pressing the adhesive treated paper against a plate, and cutting means following said pressing means and movable transverse to said advancing direction for cutting off a length of paper applied to a plate from the remaining web of paper.

2. A machine according to claim 1, which includes lifting means operable in response to a completion of a cutting off operation by said cutting means for slightly raising said pressing means and means to pull back the paper web connected to the paper roll by a predetermined distance.

3. In a machine for composing single layers of inlaid flooring elements in multiple rows to plates of a desired pattern: a horizontal pathway for receiving inlaid flooring elements and guiding the same in form of plates composed of said elements, a plurality of vertical magazine towers for each of said multiple rows arranged adjacent one end of said pathway and adapted respectively to receive and hold stacks of different groups of inlaid flooring bar elements in superimposed layers, feed means arranged adjacent said magazine towers at the bottom thereof and operable respectively to move one layer only at a time from each of said magazine towers and to move the same onto said pathway in adjacent arrangement to layers from others of the towers and advance the several layers thus fed thereon in one direction along said horizontal pathway, a roll of paper above the pathway, a pair of rollers arranged above said pathway for receiving therebetween a paper web withdrawn from said roll, said pair of rollers being suspended in a pendulum-like manner, means following said pair of rollers in the direction of advancement of said plates on said pathway for applying adhesive to the paper web passed through said pair of rollers, pressing means following said last mentioned means in said direction of advancement for pressing the adhesive treated paper against a plate, said pressing means also being suspended in a pendulum-like manner, link means interlinking said pressing means with one of said pair of rollers, means biasing said pair of rollers in a predetermined direction, and cutting means following said pressing means and movable transverse to said advancing direction for cutting off a length of paper applied to a plate from the remaining web of paper.

4. A machine according to claim 3, which includes a reversing device operatively connected to said pressing means and one of said pairs of rollers for pulling back by a certain distance the web of paper withdrawn from said paper roll and passing between said pair of rollers to said pressing means.

5. In a machine for making up parquet flooring plates comprising a plurality of juxtaposed interconnected squares with each square being composed of a single layer of groups of bar-like flooring elements; at least four vertical magazines for receiving layers of the bar-like flooring elements with all elements in any one magazine extending in the same direction, a horizontal member having one end beneath said magazines and extending therefrom to form a pathway on which plates consisting of juxtaposed layers from said magazines is made up and advanced, each magazine being spaced upwardly from said pathway a distance slightly more than the thickness of a single layer of the elements, said magazines being distributed laterally and longitudinally of said pathway and the direction of the bars in the magazines being such that layers of the bars supplied by the magazines which are adjacent each other on the pathway extend at right angles to each other, continuously operating means for feeding said elements from said magazines and along said pathway comprising feed means movable horizontally in the space between said magazines and pathway for feeding the flooring elements a layer at a time from the respective magazines to the pathway and to advance the layers of elements in grouped relation along the pathway and, paper applying means arranged above a certain part of said pathway along which said grouped layers of elements are advanced and comprising a paper supply in form of a roll, guiding means for guiding and withdrawing a paper web from said paper supply, means for applying adhesive to one side of the paper web, means for pressing said adhesively treated paper web to grouped layers of elements on said pathway, and a cutting device operable during feeding of the paper web for cutting off length of paper from said paper web corresponding to the length of the plates to be made up.

6. A machine according to claim 5 in which said magazines include two first magazines at the end of said pathway and two other magazines at the side of the pathway, said feed means including a first slide common to said two first magazines and a first crank driving said first slide longitudinally of said pathway and also including a second slide for each of said other magazines and second crank means synchronized with said first crank and driving said second slides laterally of said pathway.

7. A machine according to claim 5 in which there are two magazines at each side of the pathway longitudinally spaced from each other, first slide means for moving a layer of elements from a magazine on each side of the pathway longitudinally into juxtaposition with the bottom layer in the other magazine on the same side, second feed means for moving the juxtaposed layers of elements laterally of the pathway into adjacent relation, and third feed means for moving the group of layers on the pathway longitudinally thereof.

8. A machine according to claim 5 in which said magazines are arranged in adjacent rows when looking in the longitudinal direction of said pathway and the magazines in the respective rows being spaced longitudinally relative to those in other rows so that each magazine has at least one side exposed for filling purposes.

9. In combination in an arrangement for loading and stacking a vertical magazine tower with layers of inlaid flooring elements with all elements of all layers positioned in the same relative position in the magazine for use in connection with an inlaid flooring setting machine: a horizontal table arranged adjacent said magazine tower, said table being provided with a passageway adapted to receive and have moved therein a plurality of inlaid flooring elements, means to convey said flooring elements successively onto said table at one end of said passageway in a single row with the elements arranged transversely of the passageways one behind the other, abutment means mounted on said table at the opposite end of said passageway to engage and halt said elements in a position lateral of said tower with their ends directed toward the tower, and feeder means movable laterally of said passageway for engaging the opposite ends of said elements and feeding a certain number of said inlaid flooring elements from said passageway lengthwise into said magazine tower, said abutment means including a movable control member actuated by the pressure of said flooring elements applied by said means to feed said flooring elements to initiate operation of said feeder means movable laterally of said passageway, so that said feeder means will be operated after a sufficient number of flooring elements have been accumulated on said table to form a layer in said tower.

10. In the combination defined in claim 9, a bottom in said magazine tower adjustable as to height, and control switch means operatively connected to said magazine tower bottom positioned to be engaged by flooring elements fed into the tower and operable to initiate lowering of said bottom.

11. In a machine for making up parquet flooring plates each comprising a plurality of juxtaposed squares of flooring elements adhesively secured to a paper layer, a horizontally extending surface forming a pathway for a plurality of rows of squares, a plurality of vertical magazines for each row containing stacks of squares adjacent one end of said pathway, means for moving the end squares of said plurality of magazines for each row into the corresponding rows in said pathway and advancing said squares longitudinally along said pathway in one direction toward the opposite discharge end to form a pattern of assembled rows of squares arranged according to the positions of said magazines, paper feed means comprising a roll for adhesively applying said paper layer to said squares as said squares move in said one direction toward said opposite end, and cutting means movable transversely of said one direction to sever said paper to form said plates of squares of flooring elements.

12. In a machine as defined in claim 11, in which certain of said magazines are positioned laterally of said pathway and contain squares composed of sticks positioned transversely of said pathways, reciprocating means move the sticks from said magazines transversely of said pathway, and others of said magazines rearward of said last-named magazines contain squares composed of sticks arranged longitudinally of said pathway and reciprocating means move said sticks from the magazines longitudinally of the pathway.

13. A machine according to claim 11 in which said feed means comprises a common feed slide movable longitudinally of said pathway for moving layers of elements from all of said magazines at one time.

14. A machine according to claim 11 in which said magazines are provided with indicator means to indicate the numbers of layers therein.

15. A machine according to claim 11 in which said feed means comprises a common feed slide movable longitudinally of said pathway for moving layers of elements from all of said magazines at one time, and the pathway is provided with lateral rail means confining the several layers of elements as they are advanced by said feed slide.

16. A machine according to claim 11 in which said feed means comprises a common feed slide movable longitudinally of said pathway for moving layers of elements from all of said magazines at one time, and the pathway is provided with lateral rail means confining the several layers of elements as they are advanced by said feed slide, said rail means having a tapering entrance region and at least one rail means being resilient urged toward the other thereof.

17. In a machine for making up parquet flooring plates each comprising a plurality of juxtaposed squares adhesively secured to a paper layer, a horizontally extending surface forming a pathway for a plurality of longitudinal rows of assembled squares, a plurality of vertical magazines containing stacks of said squares adjacent one end of said pathway, the magazines for the squares of each row being arranged serially longitudinally of said pathway, reciprocating means for feeding said squares successively to and along said pathway toward its end opposite from said magazines, including means for feeding the squares for each longitudinal row from its respective magazines so that in each row the squares will be arranged successively in the same order as are their respective magazines, paper feed means comprising a roll for adhesively applying said paper layer to said squares as said squares move toward said opposite end, and cutting means to sever said paper to form said plates of squares, said reciprocating means feeding said rows of squares along said pathway to said paper feed means.

18. In a machine for making up parquet flooring plates each comprising a plurality of juxtaposed squares each formed of a plurality of sticks the length of a side of the square, each plate being composed of a plurality of squares adhesively secured to a paper layer with the sticks of each square arranged perpendicularly to the sticks of adjacent squares, a horizontally extending surface forming a pathway for a plurality of longitudinal rows of assembled squares of individual sticks, vertical magazines containing stacks of said squares of individual sticks including a plurality of magazines for the squares of each row, the magazines for the squares of each row being arranged serially longitudinally of said pathway with the sticks of the squares of successive magazines being arranged perpendicularly to each other, reciprocating means for feeding said squares successively to and along said pathway toward its end opposite said magazines, said reciprocating means including elements engaging the ends of the sticks in the squares in each magazine to move said squares from each of said magazines in a direction longitudinally of the sticks forming the square so that the reciprocating means moving the sticks from each magazine engages and moves said sticks longitudinally in the same direction as their arrangement in the rows of squares, paper feed means comprising a roll for adhesively applying said paper layer to said squares as said squares move toward said opposite end, and cutting means to sever lengths of said paper to form said plates of squares, said reciprocating means feeding said rows of squares along said pathway to said paper feed means.

References Cited by the Examiner
UNITED STATES PATENTS

| | | | |
|---|---|---|---|
| 1,126,824 | 2/1915 | Milmore | 156—564 |
| 1,350,410 | 8/1920 | Kent | 156—561 X |
| 1,620,570 | 3/1927 | Reynolds | 156—499 |
| 2,276,958 | 3/1942 | Goldsmith | 156—522 |
| 2,375,330 | 5/1945 | Sperry | 156—251 |
| 2,401,648 | 6/1946 | Kahr | 156—559 X |
| 2,647,673 | 8/1953 | Galik | 221—251 |
| 2,652,166 | 9/1953 | Johnson | 156—522 |
| 2,828,794 | 4/1958 | Baumann | 156—556 |
| 2,954,900 | 10/1960 | Brubaker | 221—251 |
| 2,958,363 | 11/1960 | Ware | 156—552 X |
| 3,118,804 | 1/1964 | Tibbak | 156—552 |

EARL M. BERGERT, *Primary Examiner.*

P. R. WILEY, M. L. KATZ, *Assistant Examiners.*